US011900323B1

(12) United States Patent
    Hood

(10) Patent No.: US 11,900,323 B1
(45) Date of Patent: Feb. 13, 2024

(54) SYSTEMS AND METHODS TO GENERATE UNITS OF WORK WITHIN A COLLABORATION ENVIRONMENT BASED ON VIDEO DICTATION

(71) Applicant: Asana, Inc., San Francisco, CA (US)

(72) Inventor: Alexander Hood, San Francisco, CA (US)

(73) Assignee: Asana, Inc., San Francisco, CA (US)

( * ) Notice: Subject to any disclaimer, the term of this patent is extended or adjusted under 35 U.S.C. 154(b) by 243 days.

(21) Appl. No.: 17/036,670

(22) Filed: Sep. 29, 2020

Related U.S. Application Data

(60) Provisional application No. 62/705,465, filed on Jun. 29, 2020.

(51) Int. Cl.
| | |
|---|---|
| *G06Q 10/10* | (2023.01) |
| *G06Q 10/101* | (2023.01) |
| *G10L 15/193* | (2013.01) |
| *G10L 15/26* | (2006.01) |
| *H04N 7/15* | (2006.01) |

(52) U.S. Cl.
CPC ......... *G06Q 10/103* (2013.01); *G06Q 10/101* (2013.01); *G10L 15/193* (2013.01); *G10L 15/26* (2013.01); *H04N 7/155* (2013.01)

(58) Field of Classification Search
CPC .. G06Q 10/103; G06Q 10/101; G10L 15/193; G10L 15/26; H04N 7/155
See application file for complete search history.

(56) References Cited

U.S. PATENT DOCUMENTS

| | | | |
|---|---|---|---|
| 5,530,861 | A | 6/1996 | Diamant |
| 5,608,898 | A | 3/1997 | Turpin |
| 5,611,076 | A | 3/1997 | Durflinger |

(Continued)

FOREIGN PATENT DOCUMENTS

| | | |
|---|---|---|
| CN | 101305350 A | 11/2008 |
| CN | 101563671 A | 10/2009 |

(Continued)

OTHER PUBLICATIONS

Sarikaya, Ruhi. "The technology behind personal digital assistants: An overview of the system architecture and key components." IEEE Signal Processing Magazine 34.1 (2017): 67-81. (Year: 2017).*

(Continued)

*Primary Examiner* — Laura Yesildag
*Assistant Examiner* — Corey Russ
(74) *Attorney, Agent, or Firm* — Esplin & Associates, PC

(57) ABSTRACT

Systems and methods to generate units of work within a collaboration environment based on video dictation are described herein. Exemplary implementations may: manage environment state information maintaining a collaboration environment; responsive to the user-initiation of video dictation sessions, obtain video information characterizing content of the video dictation sessions; responsive to detection of completion of the video dictation sessions, generate one or more units of work for the users based on the content of the video dictation sessions; responsive to detection of completion of the video dictation sessions generate, store the video information as part of the environment state information; and/or perform other operations.

18 Claims, 5 Drawing Sheets

(56) References Cited

U.S. PATENT DOCUMENTS

| | | | |
|---|---|---|---|
| 5,721,770 | A | 2/1998 | Kohler |
| 6,292,830 | B1 | 9/2001 | Taylor |
| 6,332,147 | B1 | 12/2001 | Moran |
| 6,385,639 | B1 | 5/2002 | Togawa |
| 6,629,081 | B1 | 9/2003 | Cornelius |
| 6,769,013 | B2 | 7/2004 | Frees |
| 7,020,697 | B1 | 3/2006 | Goodman |
| 7,086,062 | B1 | 8/2006 | Faour |
| 7,640,511 | B1 | 12/2009 | Keel |
| 7,676,542 | B2 | 3/2010 | Moser |
| 7,779,039 | B2 | 8/2010 | Weissman |
| RE41,848 | E | 10/2010 | Daniell |
| 7,844,454 | B2 | 11/2010 | Coles |
| 7,996,744 | B2 | 8/2011 | Ojala |
| 7,996,774 | B1 | 8/2011 | Sidenur |
| 8,522,240 | B1 | 8/2013 | Merwarth |
| 8,527,287 | B1 | 9/2013 | Bhatia |
| 8,768,751 | B2 | 7/2014 | Jakowski |
| 9,201,952 | B1 | 12/2015 | Chau |
| 9,208,262 | B2 | 12/2015 | Bechtel |
| 9,251,484 | B2 | 2/2016 | Cantor |
| 9,299,039 | B1* | 3/2016 | Wang .................... G06Q 10/06 |
| 9,600,136 | B1 | 3/2017 | Yang |
| 9,674,361 | B2 | 6/2017 | Ristock |
| 9,712,576 | B1 | 7/2017 | Gill |
| 9,830,398 | B2 | 11/2017 | Schneider |
| 9,949,681 | B2 | 4/2018 | Badenes |
| 9,953,282 | B2 | 4/2018 | Shaouy |
| 10,001,911 | B2 | 6/2018 | Breedvelt-Schouten |
| 10,264,067 | B2 | 4/2019 | Subramani |
| 10,308,992 | B2 | 6/2019 | Chauvin |
| 10,373,084 | B2 | 8/2019 | Kurjanowicz |
| 10,455,011 | B2 | 10/2019 | Kendall |
| 10,594,788 | B2 | 3/2020 | Larabie-Belanger |
| 10,616,151 | B1 | 4/2020 | Cameron |
| 10,623,359 | B1 | 4/2020 | Rosenstein |
| 10,657,501 | B2 | 5/2020 | Choi |
| 10,671,692 | B2 | 6/2020 | Koopman |
| 10,810,222 | B2 | 10/2020 | Koch |
| 10,846,105 | B2 | 11/2020 | Granot |
| 10,846,297 | B2 | 11/2020 | Smith |
| 10,922,104 | B2 | 2/2021 | Sabo |
| 10,956,845 | B1 | 3/2021 | Sabo |
| 10,977,434 | B2 | 4/2021 | Pelz |
| 10,983,685 | B2 | 4/2021 | Karpe |
| 11,062,270 | B2 | 7/2021 | Hilleli |
| 11,082,281 | B2 | 8/2021 | Rosenstein |
| 11,095,468 | B1 | 8/2021 | Pandey |
| 11,140,174 | B2 | 10/2021 | Patel |
| 11,170,761 | B2 | 11/2021 | Thomson |
| 11,204,683 | B1 | 12/2021 | Sabo |
| 11,212,242 | B2 | 12/2021 | Cameron |
| 11,263,228 | B2 | 3/2022 | Koch |
| 11,287,946 | B2 | 3/2022 | Jackson |
| 11,288,081 | B2 | 3/2022 | Sabo |
| 11,290,296 | B2 | 3/2022 | Raghavan |
| 11,327,645 | B2 | 5/2022 | Karpe |
| 11,341,444 | B2 | 5/2022 | Sabo |
| 11,341,445 | B1 | 5/2022 | Cheng |
| 11,496,711 | B1 | 11/2022 | Cronan |
| 11,627,006 | B1* | 4/2023 | Chew .................... H04L 51/02 704/275 |
| 11,676,107 | B1 | 6/2023 | Beauchamp |
| 2002/0143594 | A1 | 10/2002 | Kroeger |
| 2003/0028595 | A1 | 2/2003 | Vogt |
| 2003/0041317 | A1 | 2/2003 | Sokolov |
| 2003/0065722 | A1 | 4/2003 | Ieperen |
| 2003/0097406 | A1 | 5/2003 | Stafford |
| 2003/0097410 | A1 | 5/2003 | Atkins |
| 2003/0126001 | A1 | 7/2003 | Northcutt |
| 2003/0200223 | A1 | 10/2003 | Hack |
| 2003/0225598 | A1 | 12/2003 | Yu |
| 2004/0093290 | A1 | 5/2004 | Doss |
| 2004/0098291 | A1 | 5/2004 | Newburn |
| 2004/0162833 | A1 | 8/2004 | Jones |
| 2004/0207249 | A1 | 10/2004 | Baumgartner |
| 2004/0210470 | A1 | 10/2004 | Rusk |
| 2004/0230447 | A1 | 11/2004 | Schwerin-Wenzel |
| 2004/0268451 | A1 | 12/2004 | Robbin |
| 2005/0210394 | A1 | 9/2005 | Crandall |
| 2005/0222971 | A1 | 10/2005 | Cary |
| 2006/0030992 | A1 | 2/2006 | Iwatsuki |
| 2006/0047454 | A1 | 3/2006 | Tamaki |
| 2006/0095859 | A1 | 5/2006 | Bocking |
| 2006/0136441 | A1 | 6/2006 | Fujisaki |
| 2006/0143270 | A1 | 6/2006 | Wodtke |
| 2006/0190391 | A1 | 8/2006 | Cullen |
| 2006/0277487 | A1 | 12/2006 | Poulsen |
| 2007/0016465 | A1 | 1/2007 | Schaad |
| 2007/0038494 | A1 | 2/2007 | Kreitzberg |
| 2007/0143169 | A1 | 6/2007 | Grant |
| 2007/0255715 | A1 | 11/2007 | Li |
| 2008/0082389 | A1 | 4/2008 | Gura |
| 2008/0082956 | A1 | 4/2008 | Gura |
| 2008/0091782 | A1 | 4/2008 | Jakobson |
| 2008/0155547 | A1 | 6/2008 | Weber |
| 2008/0158023 | A1 | 7/2008 | Chung |
| 2008/0167937 | A1 | 7/2008 | Coughlin |
| 2008/0222566 | A1 | 9/2008 | Daughtrey |
| 2008/0244582 | A1 | 10/2008 | Brown |
| 2008/0270198 | A1 | 10/2008 | Graves |
| 2008/0281665 | A1 | 11/2008 | Opaluch |
| 2009/0018835 | A1* | 1/2009 | Cooper .................... G10L 15/26 704/E15.045 |
| 2009/0055796 | A1 | 2/2009 | Springborn |
| 2009/0089225 | A1 | 4/2009 | Baier |
| 2009/0089682 | A1 | 4/2009 | Baier |
| 2009/0089701 | A1 | 4/2009 | Baier |
| 2009/0100340 | A1* | 4/2009 | Paek .................... G06F 16/957 715/728 |
| 2009/0113310 | A1 | 4/2009 | Appleyard |
| 2009/0287523 | A1 | 11/2009 | Lau |
| 2009/0296908 | A1 | 12/2009 | Lee |
| 2009/0299803 | A1 | 12/2009 | Lakritz |
| 2009/0307319 | A1 | 12/2009 | Dholakia |
| 2010/0088137 | A1 | 4/2010 | Weiss |
| 2010/0106627 | A1 | 4/2010 | O'Sullivan |
| 2010/0122334 | A1 | 5/2010 | Stanzione |
| 2010/0131860 | A1 | 5/2010 | Dehaan |
| 2010/0145801 | A1 | 6/2010 | Chekuri |
| 2010/0169802 | A1 | 7/2010 | Goldstein |
| 2010/0312605 | A1 | 12/2010 | Mitchell |
| 2010/0332236 | A1* | 12/2010 | Tan .................... G10L 15/26 704/E11.001 |
| 2011/0015961 | A1 | 1/2011 | Chan |
| 2011/0022662 | A1 | 1/2011 | Barber-Mingo |
| 2011/0054968 | A1 | 3/2011 | Galaviz |
| 2011/0060720 | A1 | 3/2011 | Devereux |
| 2011/0161128 | A1 | 6/2011 | Barney |
| 2011/0307100 | A1 | 12/2011 | Schmidtke |
| 2012/0035942 | A1 | 2/2012 | Graupner |
| 2012/0066030 | A1 | 3/2012 | Limpert |
| 2012/0123835 | A1 | 5/2012 | Chu |
| 2012/0158946 | A1 | 6/2012 | Shafiee |
| 2012/0192086 | A1 | 7/2012 | Ghods |
| 2012/0304187 | A1 | 11/2012 | Maresh |
| 2012/0317108 | A1 | 12/2012 | Okazaki |
| 2013/0007332 | A1 | 1/2013 | Teh |
| 2013/0013560 | A1 | 1/2013 | Goldberg |
| 2013/0014023 | A1 | 1/2013 | Lee |
| 2013/0066944 | A1 | 3/2013 | Laredo |
| 2013/0073328 | A1 | 3/2013 | Ehrler |
| 2013/0124638 | A1 | 5/2013 | Barreto |
| 2013/0179799 | A1 | 7/2013 | Savage |
| 2013/0246399 | A1 | 9/2013 | Schneider |
| 2013/0275229 | A1 | 10/2013 | Moganti |
| 2013/0279685 | A1 | 10/2013 | Kohler |
| 2013/0318447 | A1 | 11/2013 | Deluca |
| 2013/0321467 | A1 | 12/2013 | Tappen |
| 2013/0339099 | A1 | 12/2013 | Aidroos |
| 2014/0012603 | A1 | 1/2014 | Scanlon |
| 2014/0028826 | A1* | 1/2014 | Lee .................... G10L 15/25 348/77 |
| 2014/0040780 | A1 | 2/2014 | Artz |

(56) References Cited

U.S. PATENT DOCUMENTS

| | | |
|---|---|---|
| 2014/0040905 A1 | 2/2014 | Tadanobu |
| 2014/0058801 A1 | 2/2014 | Deodhar |
| 2014/0059910 A1 | 3/2014 | Norton |
| 2014/0089719 A1 | 3/2014 | Daum |
| 2014/0172478 A1 | 6/2014 | Vadasz |
| 2014/0189017 A1 | 7/2014 | Prakash |
| 2014/0200944 A1 | 7/2014 | Henriksen |
| 2014/0208325 A1 | 7/2014 | Chen |
| 2014/0218372 A1* | 8/2014 | Missig ............... G06F 3/04883 345/173 |
| 2014/0236663 A1 | 8/2014 | Smith |
| 2014/0257894 A1 | 9/2014 | Melahn |
| 2014/0288987 A1 | 9/2014 | Liu |
| 2015/0006448 A1 | 1/2015 | Gupta |
| 2015/0007058 A1 | 1/2015 | Wooten |
| 2015/0113540 A1 | 4/2015 | Rabinovici |
| 2015/0149540 A1 | 5/2015 | Barker |
| 2015/0153906 A1 | 6/2015 | Liao |
| 2015/0154291 A1 | 6/2015 | Shepherd |
| 2015/0169069 A1 | 6/2015 | Lo |
| 2015/0181020 A1* | 6/2015 | Fitzsimmons .... H04M 3/42221 379/67.1 |
| 2015/0215256 A1 | 7/2015 | Ghafourifar |
| 2015/0262111 A1 | 9/2015 | Yu |
| 2015/0363092 A1 | 12/2015 | Morton |
| 2015/0379472 A1 | 12/2015 | Gilmour |
| 2016/0048408 A1 | 2/2016 | Madhu |
| 2016/0063192 A1 | 3/2016 | Johnson |
| 2016/0063449 A1 | 3/2016 | Duggan |
| 2016/0110670 A1 | 4/2016 | Chatterjee |
| 2016/0124775 A1 | 5/2016 | Ashtiani |
| 2016/0162819 A1 | 6/2016 | Hakman |
| 2016/0180277 A1 | 6/2016 | Skiba |
| 2016/0180298 A1 | 6/2016 | McClement |
| 2016/0182311 A1 | 6/2016 | Borna |
| 2016/0188145 A1 | 6/2016 | Vida |
| 2016/0216854 A1 | 7/2016 | McClellan |
| 2016/0224939 A1 | 8/2016 | Chen |
| 2016/0275436 A1 | 9/2016 | Kurjanowicz |
| 2016/0328217 A1 | 11/2016 | Hagerty |
| 2017/0017924 A1 | 1/2017 | Kashiwagi |
| 2017/0039503 A1 | 2/2017 | Jones |
| 2017/0061341 A1 | 3/2017 | Haas |
| 2017/0068933 A1 | 3/2017 | Norton |
| 2017/0093874 A1 | 3/2017 | Uthe |
| 2017/0097929 A1* | 4/2017 | Cecchi ..................... G06F 16/35 |
| 2017/0103369 A1 | 4/2017 | Thompson |
| 2017/0116552 A1 | 4/2017 | Deodhar |
| 2017/0132200 A1 | 5/2017 | Noland |
| 2017/0154024 A1 | 6/2017 | Subramanya |
| 2017/0161258 A1 | 6/2017 | Astigarraga |
| 2017/0206217 A1 | 7/2017 | Deshpande |
| 2017/0249577 A1 | 8/2017 | Nishikawa |
| 2017/0316367 A1 | 11/2017 | Candito |
| 2017/0317898 A1 | 11/2017 | Candito |
| 2017/0323233 A1 | 11/2017 | Bencke |
| 2017/0323350 A1 | 11/2017 | Laderer |
| 2017/0344754 A1 | 11/2017 | Kumar |
| 2017/0346861 A1 | 11/2017 | Pearl |
| 2017/0351385 A1 | 12/2017 | Ertmann |
| 2017/0364866 A1 | 12/2017 | Steplyk |
| 2018/0052943 A1 | 2/2018 | Hui |
| 2018/0059910 A1 | 3/2018 | Wooten |
| 2018/0060178 A1 | 3/2018 | Ishiyama |
| 2018/0075387 A1 | 3/2018 | Kulkarni |
| 2018/0089625 A1 | 3/2018 | Rosati |
| 2018/0102989 A1 | 4/2018 | Borsutsky |
| 2018/0131649 A1 | 5/2018 | Ma |
| 2018/0165610 A1 | 6/2018 | Dumant |
| 2018/0173386 A1 | 6/2018 | Adika |
| 2018/0189706 A1 | 7/2018 | Newhouse |
| 2018/0189736 A1 | 7/2018 | Guo |
| 2018/0225618 A1 | 8/2018 | Shaouy |
| 2018/0225795 A1 | 8/2018 | Napoli |
| 2018/0247352 A1 | 8/2018 | Rogers |
| 2018/0247648 A1* | 8/2018 | Nadimpalli ............. G10L 15/22 |
| 2018/0260081 A1 | 9/2018 | Beaudoin |
| 2018/0316636 A1 | 11/2018 | Kamat |
| 2018/0331842 A1 | 11/2018 | Faulkner |
| 2018/0341903 A1 | 11/2018 | Keen |
| 2018/0367477 A1 | 12/2018 | Hariram |
| 2018/0367483 A1 | 12/2018 | Rodriguez |
| 2019/0014070 A1 | 1/2019 | Mertvetsov |
| 2019/0018552 A1 | 1/2019 | Bloy |
| 2019/0050811 A1 | 2/2019 | Kang |
| 2019/0138583 A1 | 5/2019 | Silk |
| 2019/0138589 A1 | 5/2019 | Udell |
| 2019/0139004 A1 | 5/2019 | Vukovic |
| 2019/0187987 A1 | 6/2019 | Fauchère |
| 2019/0258985 A1 | 8/2019 | Daniek |
| 2019/0265821 A1 | 8/2019 | Pearl |
| 2019/0272902 A1 | 9/2019 | Vozila |
| 2019/0318321 A1* | 10/2019 | Lopez Venegas .. H04L 12/1822 |
| 2019/0340574 A1 | 11/2019 | Ekambaram |
| 2019/0347126 A1 | 11/2019 | Bhandari |
| 2019/0362252 A1* | 11/2019 | Miller ...................... G06N 5/04 |
| 2020/0019907 A1 | 1/2020 | Notani |
| 2020/0059539 A1 | 2/2020 | Wang |
| 2020/0065736 A1 | 2/2020 | Relangi |
| 2020/0074510 A1 | 3/2020 | Corodimas |
| 2020/0118568 A1* | 4/2020 | Kudurshian ........ G10L 15/1815 |
| 2020/0162315 A1 | 5/2020 | Siddiqi |
| 2020/0193556 A1 | 6/2020 | Jin |
| 2020/0228474 A1 | 7/2020 | Cameron |
| 2020/0233879 A1 | 7/2020 | Papanicolaou |
| 2020/0244611 A1 | 7/2020 | Rosenstein |
| 2020/0328906 A1 | 10/2020 | Raghavan |
| 2020/0344253 A1 | 10/2020 | Kurup |
| 2020/0349614 A1* | 11/2020 | Batcha ................ H04M 3/5141 |
| 2021/0004380 A1 | 1/2021 | Koch |
| 2021/0004381 A1 | 1/2021 | Smith |
| 2021/0089860 A1* | 3/2021 | Heere ..................... G06N 20/00 |
| 2021/0097466 A1 | 4/2021 | Sabo |
| 2021/0103451 A1 | 4/2021 | Sabo |
| 2021/0110347 A1 | 4/2021 | Khalil |
| 2021/0117479 A1* | 4/2021 | Liu ......................... G06N 3/082 |
| 2021/0134296 A1* | 5/2021 | Iturbe Desentis ...... G06F 40/20 |
| 2021/0136012 A1 | 5/2021 | Barbitta |
| 2021/0182475 A1 | 6/2021 | Pelz |
| 2021/0209561 A1 | 7/2021 | Kishore |
| 2021/0216562 A1 | 7/2021 | Smith |
| 2021/0232282 A1 | 7/2021 | Karpe |
| 2021/0287673 A1* | 9/2021 | Kaplan ................ G10L 15/1822 |
| 2021/0319408 A1* | 10/2021 | Jorasch ............. G06Q 10/1095 |
| 2021/0320891 A1 | 10/2021 | Rosenstein |
| 2021/0342786 A1 | 11/2021 | Jiang |
| 2021/0365862 A1* | 11/2021 | Doan ..................... G06N 20/00 |
| 2021/0382734 A1 | 12/2021 | Rosenstein |
| 2022/0019320 A1 | 1/2022 | Sabo |
| 2022/0058548 A1 | 2/2022 | Garg |
| 2022/0060345 A1* | 2/2022 | Wiener ............... H04L 12/1818 |
| 2022/0075792 A1 | 3/2022 | Koch |
| 2022/0078142 A1 | 3/2022 | Cameron |
| 2022/0158859 A1 | 5/2022 | Raghavan |
| 2022/0207489 A1 | 6/2022 | Gupta |
| 2022/0377279 A1 | 11/2022 | Cronan |
| 2023/0071838 A1 | 3/2023 | Hood |

FOREIGN PATENT DOCUMENTS

| | | |
|---|---|---|
| CN | 102378975 B | 5/2015 |
| WO | 2015036817 A1 | 3/2015 |
| WO | 2015123751 A1 | 8/2015 |
| WO | 2020006634 A1 | 1/2020 |

OTHER PUBLICATIONS

Nanos, Antonios G., and Anne E. James. "A virtual meeting system for the new age." 2013 IEEE 10th International Conference on e-Business Engineering. IEEE, 2013. (Year: 2013).*

Dawei Li, "Deepcham: Collaborative Edge-Mediated Adaptive Deep Learning for Mobile Object Recognition", 2016, IEEE/ACM, pp. 64-76. (Year: 2016).

(56) References Cited

OTHER PUBLICATIONS

Assef, F., Cassius, T. S., & Maria, T. S. (2018). Confrontation between techniques of time measurement. Journal of Manufacturing Technology Management, 29(5), 789-810. (Year: 2018).

Macro, computer science, wikipedia, archives org Feb. 11, 2020 http://web.archive.org/web/20200211082902/https://en.wikipedia.org/wiki/Macro_(computer_science) (Year: 2020).

Creating Tables with Fields from 2 Different Tables, published: 2009, publisher: StackOverflow, pp. 1-2. (Year: 2009).

"Rules of Data Conversion from Document to Relational Databases", published: 2014, publisher: Future-processing, pp. 1-8 (Year: 2014).

Helen Mongan-Rallis & Terrie Shannon, "Synchronous Chat," Aug. 2016, Dept. of Education, Univ. of MN Duluth, web.archive.org/web/20160825183503/https://www.d.umn.edu/hrallis/professional/presentations/cotfsp06/indiv_tools/sync_chat.htm (Year: 2016) (2 pages).

Wix.com, How to Use Wix Code with Marketing Tools to Create Custom Events, Oct. 18, 2018, YouTube, https://www.youtube.com/watch?v=MTBVykOYGvO&feature=emb_title, 2 pages.

Critical chain project management, Wikipedia, archives org, Dec. 17, 2016 https://web.archive.Org/web/20161217090326/https://en.wikipedia.org/wiki/Critical_chain_project_management (Year: 2016) 5 pages.

Critical Path Method, Wikipedia, archives org, Sep. 19, 2017 https://web.archive.Org/web/20170919223814/https://en.wikipedia.org/wiki/Critical_path_method (Year: 2017) 6 pages.

Fruhlinger, Joshua. "The Best To-Do ListApps for Feeling Productive; With the right app, feeling productive can be just as gratifying as actually getting things done" Wall Street Journal (Online); New York, N.Y. [New York, N.Y]Nov. 8, 2013 (Year: 2013) 4 pages.

www.asana.com (as retrieved from https://web.archive.Org/web/20160101054536/https://asana.com/press and https:// web.archive.org/web/20160101054527/https://asana.com/product) (Year: 2016) 15 pages.

Tiburca, Andrew) Best Team Calendar Applications for 2018-Toggl https://toggl.com/blog/best-team-calendar-applications-for-2018 (Year: 2017).

Lauren Labrecque, "Fostering Consumer-Brand Relationships in Social Media Environments: The Role of Parasocial Interaction", 2014, Journal of Interactive Markeing, 28 (2014), pp. 134-148 (Year: 2014).

Hartmann, "TimeProjectscheduling with resource capacities and requests varying with time: a case study," 2013, Flexible services and manufacturing journal, vol. 25, No. 1, pp. 74-93 (Year: 2013).

Paul Minors, How to automate your tasks, youtube excerpts, Oct. 18, 2019 https://www.youtube.com/watch?v=IwF9XyUQrzw (Year: 2019).

Mauricio Aizawa, Zapier, How to Automate Asana Tasks creation using Evernote, youtube excerpts, Mar. 16, 2018 https://www.youtube.com/watch?v=BjDQ4Gny4WI (Year: 2018).

Cabanillas, Cristina, Manuel Resinas, and Antonio Ruiz-Cortés. "A template-based approach for responsibility management in executable business processes." Enterprise information systems 12.5 (2018): 550-586. (Year: 2018).

Shi, Yang, et al. "Meetingvis: Visual narratives to assist in recalling meeting context and content." IEEE Transactions on Visualization and Computer Graphics 24.6 (2018): 1918-1929. (Year: 2018).

\* cited by examiner

SYSTEMS AND METHODS TO GENERATE UNITS OF WORK WITHIN A COLLABORATION ENVIRONMENT BASED ON VIDEO DICTATION

FIELD OF THE DISCLOSURE

The present disclosure relates to generating units of work within a collaboration environment based on video dictation.

BACKGROUND

Collaboration environments, sometimes referred to as integrated collaboration environments, may enable users to assign projects, tasks, or other assignments to assignees (e.g., other users) to complete. A collaboration environment may comprise an environment in which a virtual team of users does its work. A collaboration environment may enable users to work in a more organized and efficient manner. A collaboration environment may integrate features and/or functionality such as web-based conferencing and collaboration, desktop videoconferencing, and/or instant message into a single easy-to-use, intuitive interface.

SUMMARY

One aspect of the present disclosure relates to a system configured to generate units of work within a collaboration environment based on video dictation. Collaboration environments typically require users to manually input to-do items. Video dictation may solve one or more problems with conventional solutions where manual input of the units of work may be otherwise required. Typically, without such manual input, computers generally cannot generate and/or manage units of work for users automatically. This creates more work for users and reduces user efficiency. As such, users and companies waste valuable resources and may be unlikely to use a work management platform long term. One or more implementations of the systems and methods presented herein may facilitate determining one or more units of work in real-time and/or near real-time for one or more users participating in a video dictation session through a graphical video interface and/or based on content from a video dictation session through the graphical video interface.

One aspect of a system configured to generate units of work within a collaboration environment based on video dictation may include one or more of: one or more servers, one or more client computing platforms, and/or other components. The one or more servers may be configured to communicate with one or more client computing platforms according to a client/server architecture and/or other architecture. The one or more servers and/or client computing platforms may include one or more physical processors configured to execute one or more computer program components. The computer program components may include one or more of an environment state component, a collaboration environment component, a dictation component, a work component, a trigger phrase component, and/or other components.

The environment state component may be configured to manage environment state information maintaining a collaboration environment. The collaboration environment may be configured to facilitate interaction by users with the collaboration environment and/or other interactions. The environment state information may include work units records describing units of work assigned, created, and/or managed within the collaboration environment. The environment state component may be configured to effectuate transmission of the environment state information to client computing platform(s), and/or vice versa. In some implementations, the environment state component may be configured to receive information over a network from the client computing platforms(s). The environment state component may be configured to effectuate storage of the received information as environment state information to one or more of user records, project records, work unit records, and/or other records.

The dictation component may be configured to obtain user input information and/or other information. The user input information may characterize user-initiation of video dictation sessions by individual users of the collaboration environment.

The dictation component may be configured to obtain video information and/or other information. The video information may characterize content of the video dictation sessions. The dictation component may be configured to obtain video information responsive to the user-initiation of the video dictation sessions. The content of the video dictation sessions may comprise one or more of visual content, audio content, and/or other content. The visual content may include visual representations of the individual users during the video dictation sessions and/or other visual content. The audio content may include speech of the individual users during the video dictation sessions and/or other audio content. By way of non-limiting illustration, responsive to the user-initiation of a first video dictation session by a first user, the dictation component may obtain first video information characterizing content of the first video dictation session.

The work component may be configured to generate one or more units of work based on content of the video dictation sessions and/or other information. The work component may be configured to generate one or more units of work by storing information defining the one or more units of work as part of the environment state information. Such generation may be responsive to detection of completion of the video dictation sessions and/or other triggers. The one or more units of work may be generated by creating and/or storing one or more work unit records for the one or more units of work. By way of non-limiting illustration, a first unit of work may be generated based on the content of the first video dictation session by storing information defining the first unit of work in a first work unit record.

The work component may be configured to store the video information as part of the environment state information and/or other information. Such storage may be responsive to detection of completion of the video dictation sessions. The video information may be included in the one or more work unit records generated for the one or more units of work. By way of non-limiting illustration, the first video information may be stored in the first work unit record.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
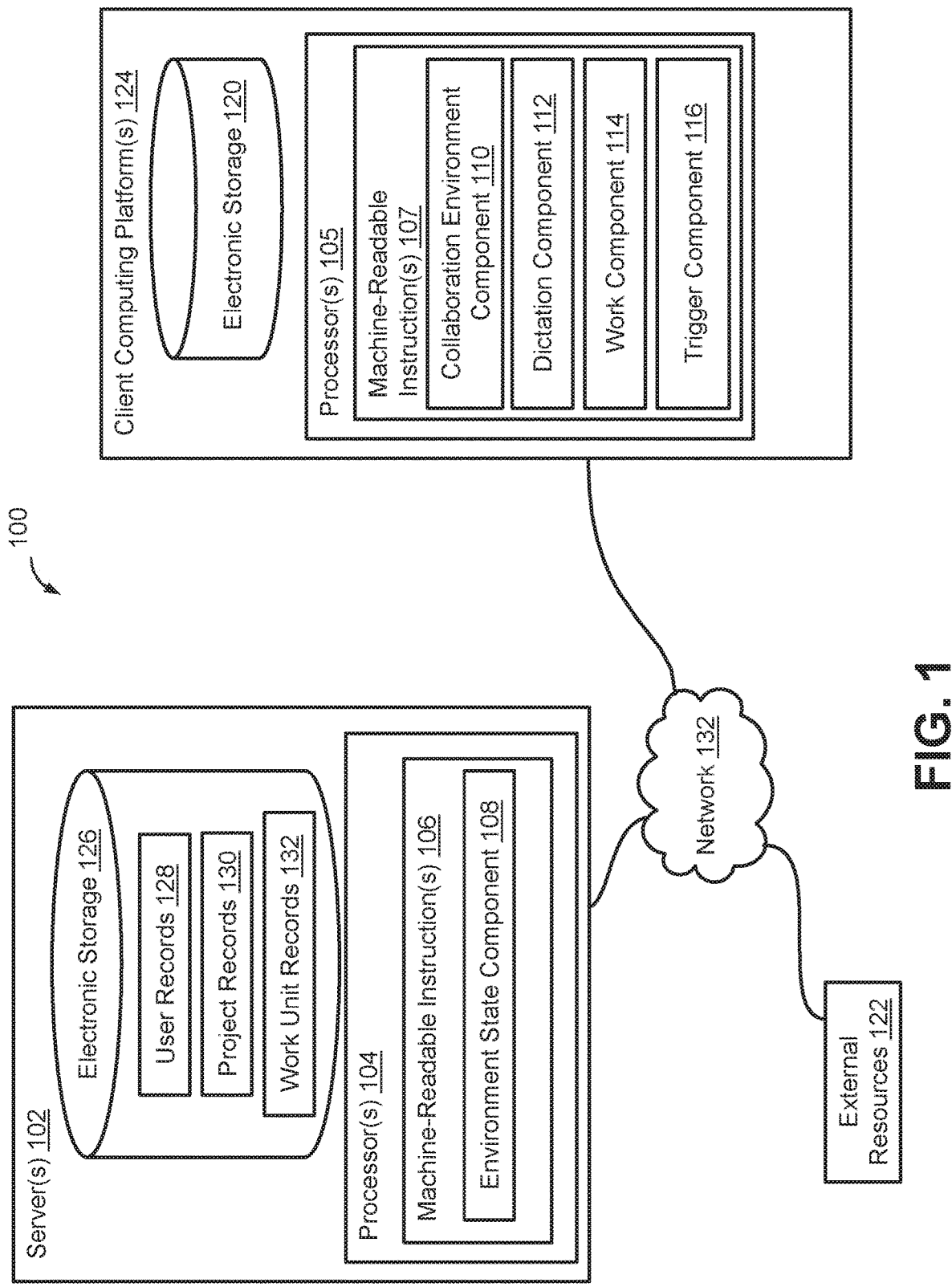
FIG. 1 illustrates a system configured to generate units of work within a collaboration environment based on video dictation, in accordance with one or more implementations.

FIG. 1 illustrates a system 100 configured to generate units of work within a collaboration environment based on video dictation. Video dictation may solve one or more problems with conventional solutions where manual input of the units of work may be otherwise required. The units of work may be determined dynamically for one or more users participating in a video dictation session through a graphical video interface and/or based on content from the video dictation session through the graphical video interface. Units of work may be generated in real-time, near-real time, at the end of a given video dictation session, and/or at any other time during the given video dictation session.

The presentation of the collaboration environment may be based on environment state information and/or other information. The environment state information may include user records 128, project records 130, work unit records 132, and/or other records. The environment state information may be continuously generated and/or updated based on the state of the collaboration environment representing the users' interactions with the collaboration environment. The state of the collaboration environment may include a user state, a project state, a work unit state, and/or other states. The user state may be defined by user records 128. User records 128 may define user information associated with users interacting with and/or viewing the collaboration environment. The project state may be defined by project records 130. Project records 130 may define project information for projects managed within the collaboration environment. Managing may include one or more of obtaining, defining, storing, updating, deleting, and/or other operations. The work unit state may be defined by work unit records 132. Work unit records 132 may define work information for units of work assigned to, created by, and/or managed by individual users within the collaboration environment.

The user information may include values of user parameters and/or other information. The values of the user parameters may be organized in user records corresponding to users interacting with and/or viewing the collaboration environment. The values of the user parameters associated with the users interacting with and/or viewing the collaboration environment may include information describing the users, their actions within the collaboration environment, their settings, and/or other user information; and/or metadata associated with the users, their actions within the environment, their settings, and/or other user information. Individual ones of the users may be associated with individual ones of the user records. A user record may define values of the user parameters associated with a given user interacting with and/or viewing the collaboration environment.

The values of the user parameters may, by way of non-limiting example, specify one or more of: a user name, a group parameter, a user account, user role information, a user department, descriptive user content, a to—email, a from—email, a photo, an organization, a workspace, one or more projects (which may include project parameters defined by one or more work unit records), one or more items of work (which may include one or more unit of work parameters defined by one or more unit of work records), one or more user comments, one or more teams the user belongs to, one or more of the user display settings (e.g., colors, size, project order, task order, other unit of work order, etc.), one or more authorized applications, one or more interaction parameters (e.g., indicating a user is working on/worked on a given unit of work, a given user viewed a given unit of work, a given user selected a given unit of work, a timeframe a given user last interacted with and/or worked on a given unit of work, a time period that a given unit of work has been idle, and/or other interaction parameters), a presence parameter (e.g., indicating presence and/or interaction level at an environment level, unit of work level, project level, task level, application level, etc.), one or more notification settings, one or more progress parameters, status information for one or more units of work the user is associated with (units of work assigned to the user, assigned to other users by the user, completed by the user, past-due date, and/or other information), one or more performance metrics of a given user (e.g., how many units of work the user has completed, how quickly the user completed the units of work, how quickly the user completes certain types of units of work, the efficiency of the user, bandwidth of the user, activity level of the user, etc.), application access information (e.g., username/password for one or more third-party applications), one or more favorites and/or priorities, schedule information, sets of preferences of a given user, other user parameters for the given user.

User role information may specify individual roles of the individual users in the individual units of work. A role may represent a position of an individual user. The position may be specified based on a description of one or more of job title, level, stage, and/or other descriptions of position. The role may be specified with respect to a company as a whole, a particular unit of work, and/or other considerations. By way of non-limiting illustration, a role may include one or more of chief executive officer (or other officer), owner, manager, supervisor, accountant, associate, employee, entry level, intern, midlevel, senior, administrator, director, foreman, engineer, product developer, human resource officer, artist, art director, and/or other description.

Schedule information for the individual users may include one or more calendar entries associated with the individual users. The individual calendar entries may be associated with individual start dates and individual end dates.

In some implementations, schedule information may be stored locally within electronic storage 126 by virtue of features and/or functionality provided within a collaboration environment. By way of non-limiting illustration, a collaboration environment may have the features and/or functionality of a calendar application configured to facilitate calendaring entries into a schedule. It is noted that schedule information may be determined through features and/or functionality provided by one or more external resources 122. By way of non-limiting illustration, an external resource may include a calendar application which may be external to a collaboration environment. The collaboration environment may have permissions to access the external calendar application to determine and/or obtain schedule information.

The work information may include values of one or more work unit parameters. The values of the work unit parameters may be organized in work unit records corresponding to units of work managed, created, and/or assigned within the collaboration environment. A given unit of work may have one or more assignees and/or team members working on the given unit of work. Units of work may be associated with one or more to-do items, action items, objectives, and/or other units of work one or more users should accomplish and/or plan on accomplishing. Units of work may be created by a given user for the given user and/or created by the given user and assigned to one or more other users. A given unit of work may include one or more of a task, a sub-task, and/or other units of work possibly assigned to and/or associated with one or more users.

The individual sets of preferences of the individual users may include individual sets of automated actions to carry out in response to occurrence of individual trigger events. The automated actions may include one or more of generation of a project, generation of a task, assignment to a particular user, attachment of one or more particular documents, setting one or more values of one or more work unit parameters, and/or other actions that may be automated responsive to trigger events.

In some implementations, individual sets of automated actions and associated individual trigger events may be stored in individual automation records. An automation record may define one or more of individual actions, individual trigger events, and/or other information. Individual actions may be defined by a target component, an action component, and/or other information. The target component of an automation record may include the environment parameter (or parameters) to which an action is to be carried out on. The action component of an automation record may define what change is to be made on the environment parameter (or parameters) defined by the target component.

Individual trigger events may be defined by a source component, an event component, and/or other information. The source component of an automation record may include the environment parameter (or parameters) from which occurrences of a trigger event may be derived. The event component may include the value (or change in the value) for the environment parameter (or parameters) defined by the source component from which occurrences of a trigger event may be derived.

In some implementations, individual automation records may store counts of occurrences of individual trigger events and/or occurrences of carrying out individual automation actions in the sets of automation actions.

It is noted that while some descriptions presented herein may be directed to an individual trigger event causing an individual set of automated actions to be carried out within the collaboration environment, this is for illustrative purposes only and not to be considered limiting. For example, in some implementations, multiple trigger events may be combined together through some logic criteria, that when satisfied, may cause an individual set of automated actions to be carried out within the collaboration environment. Logic may include, for example, Boolean logic. By way of non-limiting illustration, logic operators such as "AND", "OR", "NOT", and/or other operations may be utilized to generate more complex trigger combinations for sets of automated actions. In some implementations, the use of logic operators may allow for fewer discrete trigger events to be defined yet still have more complex behavior available to users. For example, there may not be a need to specify a trigger event of "when task is unassigned", since through the use of a logic operator "NOT", a trigger event may be defined by "when task assigned" combined with the operator "NOT". Further, the Boolean logic may facilitate multistage automation. By way of non-limiting illustration, instead of input "than-if-then" or "if-and-if-then", logic may include "if-then-then" and/or other operators. In some implementations, a user may specify a set, or pool, of trigger events to trigger one or more automated actions. In some implementations, a user may specify that one or more of the trigger events in the set may individually and/or in combination trigger the one or more automated actions. This way, a user may specify multiple options of trigger events which may trigger one or more automated actions. Further, an individual trigger event may trigger multiple automated actions.

Individual work unit records may include hierarchical information defining a record hierarchy of the individual work unit records. The hierarchical information of a work unit record may include one or more of information identifying other work unit records associated in a record hierarchy the work unit record belongs to, a specification of the position of the work unit record in the hierarchy, restrictions and/or other relationships placed on the work unit record by virtue of its position, and/or other information.

A record hierarchy may convey individual positions of individual work unit records (and their corresponding units of work) in the record hierarchy. By way of non-limiting illustration, a position may specify one or more of a work unit record being superior to another work unit record, a work unit record being subordinate to another work unit record, and/or other information. As a result, individual work unit records in the individual sets of work unit records may be subordinate to other individual work unit records in the individual sets of work unit records. For example, a work unit record may define a unit of work comprising a task, and a subordinate work unit record may define a unit of work comprising a sub-task to the task. A record hierarchy may define a relationship between work unit records. A work unit record may have some restrictions placed on it by virtue of having a subordinate work unit record. By way of non-limiting illustration, a work unit record may be restricted from access by one or more users unless and/or until a subordinate work unit record is completed and/or started.

The one or more work unit parameters may include one or more of a work assignment parameter, a work management parameter, work creation parameter, and/or other parameters. The values of the work assignment parameter may describe units of work assigned to the individual users. The values of the work management parameter may describe units of work managed by the individual users. The values of the work creation parameter may describe units of work created by the individual users.

In some implementations, values of one or more work unit parameters of a given unit of work may describe the unit of work based on one or more of a unit of work name, a unit of work description, one or more unit of work dates (e.g., a start date, a due date, an end date, a completion date, and/or dates), one or more members associated with a unit of work (e.g., an owner, one or more other project/task members, member access information, and/or other unit of work members and/or member information), a status parameter (e.g., an update, a hardcoded status update, a completed/uncomplete/mark complete, a measured status, a progress indication, quantity of sub-work units remaining for a given unit of work, completed units of work in a given project, and/or other status parameter), one or more user comment parameters (e.g., permission for who may comments such as a creator, a recipient, one or more followers, and/or one or more other interested parties; content of the comments; one or more times; presence or absence of the functionality of up-votes; one or more hard-coded responses; and/or other parameters.), one or more interaction parameters (e.g., indicating a given unit of work is being worked on/was worked on, given unit of work was viewed, a given unit of work was selected, how long the given unit of work has been idle, a last interaction parameter indicating when and what user last interacted with the given unit of work, users that interacted with the given unit of work, and/or other interaction parameters indicating sources of the interactions, context of the interactions, content of the interactions and/or time for the interactions), one or more file attachments, notification settings, privacy, an associated URL, one or more interaction parameters (e.g., sources of the interactions, context of the interactions, content of the interactions, time for the interactions, and/or other interaction parameters), updates, ordering of units of work within a given unit of work (e.g., tasks within a project, subtasks within a task, etc.), state of a workspace for a given unit of work (e.g., application state parameters, application status, application interactions, user information, and/or other parameters related to the state of the workspace for a unit of work), dependencies between one or more units of work, one or more custom fields (e.g., priority, cost, stage, and/or other custom fields), and/or other information.

The values of the work assignment parameter describing units of work assigned to the individual users may be determined based on one or more interactions by one or more users with a collaboration environment. In some implementations, one or more users may create and/or assign one or more unit of work to themselves and/or an other user. In some implementations, a user may be assigned a unit of work and the user may effectuate a reassignment of the unit of work from the user or one or more other users.

In some implementations, values of the work assignment parameter may indicate that a status parameter of a unit of work has changed from "incomplete" to "marked complete" and/or "complete". In some implementations, a status of complete for a unit of work may be associated with the passing of an end date associated with the unit of work. In some implementations, a status of "marked complete" may be associated with a user providing input via the collaboration environment at the point in time the user completes the unit of work (which may be before or after an end date). In some implementations, for the purposes of measuring workload, values of the work assignment parameter for a unit of work indicating a status of "marked complete" and/or "complete" may be treated as if the unit of work is no longer assigned to the user for the purpose of measuring a current workload of the user.

The project information may define values of project parameters for projects managed within the collaboration environment. The project parameters may characterize one or more projects managed within the collaboration environment and/or via the collaboration work management platform, and/or the metadata associated with the one or more projects. Individual ones of the projects may be associated with individual ones of the project records. The project information may define values of the project parameters associated with a given project managed within the collaboration environment and/or via the collaboration work management platform. A given project may have one or more owners and/or one or more team members working on the given project. A given project may include one or more units of work assigned to one or more users under a given project heading. A given project may include a plurality of units of work assigned to one or more users under a given project heading.

The project parameters may, by way of non-limiting example, include one or more of: individual units of work within individual ones of the projects (which may include parameters defined by one or more work unit records), one or more user comment parameters (e.g., a creator, a recipient, one or more followers, one or more other interested parties, content, one or more times, upvotes, other hardcoded responses, etc.), a project name, a project description, one or more project dates (e.g., a start date, a due date, a completion date, and/or other project dates), one or more project members (e.g., an owner, one or more other project members, member access information, and/or other project members and/or member information), a status and/or progress (e.g., an update, a hardcoded status update, a measured status, quantity of units of work remaining in a given project, completed units of work in a given project, and/or other status parameter), one or more attachments, notification settings, privacy, an associated URL, one or more interaction parameters (e.g., sources of the interactions, context of the interactions, content of the interactions, time for the interactions, and/or other interaction parameters), updates, ordering of units of work within the given project, state of a workspace for a given task within the given project, other project parameters for the given project, and/or other information As is illustrated in FIG. 1, system 100 may include one or more of one or more servers 102, one or more client computing platforms 124, external resources 122, and/or other components. Users may interact with system 100 via one or more client computing platforms 124. The one or more servers 102 may be configured to communicate with one or more client computing platforms 124 according to a client/server architecture and/or other communication schemes. The one or more client computing platforms 124 may include one or more of a cellular telephone, a smartphone, a digital camera, a laptop, a tablet computer, a desktop computer, a television set-top box, smart TV, a gaming console, and/or other client computing platforms.

The one or more servers 102 may include one or more physical processors 104 (also referred to herein as "one or more processors" and/or "processor(s)"), non-transitory electronic storage 126, and/or other components. Non-transitory electronic storage 126 may include one or more records. The one or more records may store the environment state information that defines the state of the collaboration environment. The state of the collaboration environment may include a user state, a project state, a work unit state, and/or other states. The records may include the user records 128, the project records 130, the work unit records 132, and/or other records. The one or more physical processors 104 may be configured to access one or more of user records 128, project records 130, work unit records 132, and/or other records to effectuate transmission of the environment state information over network 132 to client computing platform(s) 124. Client computing platform(s) 124 may use the environment state information to effectuate presentation of the collaboration environment via client computing platform(s) 124.

The one or more physical processors 104 may be configured to execute machine-readable instructions 106. The machine-readable instructions 106 may include one or more computer program components. The computer program components may include an environment state component 108 and/or other components.

The client computing platform(s) 124 may include one or more physical processors 105, non-transitory electronic storage 120, and/or other components. The one or more physical processors 105 may be configured to execute machine-readable instructions 107. The machine-readable instructions 107 may include one or more computer program components. The computer program components may include one or more of a collaboration environment component 110, a dictation component 112, a work component 114, a trigger component 116, and/or other components.

It is noted that while some computer program components may be shown and/or described as attributed to an individual one of one or more of client computing platform(s) 124 and/or server(s) 102, this is for illustrative purposes only. Instead, it is to be understand that the features and/or functionality of one or more of the computer program components attributed to client computing platform(s) 124 may additionally and/or alternatively be attributed to server(s) 102, and vice versa.

In some implementations, server(s) 102 may be configured to provide remote hosting of the features and/or functions of machine-readable instructions 106 to one or more client computing platform(s) 124 that may be remotely located from server(s) 102. In some implementations, one or more features and/or functions of server(s) 102 may be attributed as local features and/or functions of one or more client computing platform(s) 124. For example, individual ones of the client computing platform(s) 124 may include one or more additional machine-readable instructions comprising the same or similar components as machine-readable instructions 106 of server(s) 102. The client computing platform(s) 124 may be configured to locally execute the one or more components that may be the same or similar to the machine-readable instructions 106. One or more features and/or functions of machine-readable instructions 106 of server(s) 102 may be provided, at least in part, as an application program that may be executed at a given client computing platform 124. One or more features and/or functions of machine-readable instructions 107 may be provided, at least in part, at server(s) 102.

The client computing platform(s) 124 may monitor, and/or collect information for transmission to the one or more server(s) 102 to be stored as environment state information. The client computing platform(s) 124 may obtain and/or collect environment state information from the one or more server(s) 102.

Referring now to server(s) 102, the environment state component 108 may be configured to manage environment state information and/or other information used in maintaining a collaboration environment. Managing may include one or more of obtaining, defining, storing, updating, deleting, and/or other operations. The collaboration environment may be configured to facilitate interaction by users with the collaboration environment and/or other interactions. The environment state information may include one or more of the user information, work information, and/or other information used to define, support, and/or otherwise maintain a collaboration environment.

The environment state component 108 of machine-readable instructions 106 may be configured to effectuate transmission of the environment state information to client computing platform(s) 124, and/or vice versa. In some implementations, environment state component 108 may be configured to receive information over network 132 from client computing platforms(s) 124. Environment state component 108 may be configured to effectuate storage of the received information as environment state information to one or more user records 128, project records 130, work unit records 132, and/or other records. Environment state component 108 may be configured to obtain one or more user records 128, project records 130, work unit records 132, and/or other records in response to and/or based on one or more requests from client computing platform(s) 124. Environment state component 108 may be configured to effectuate transmission of values for user parameters, values for project parameters, values for work unit parameters, and/or other state information to client computing platform(s) 124. The values for user parameters, values for project parameters, values for work unit parameters, and/or other state information may be used to effectuate presentation of the relevant units of work and/or projects for a given user of the collaboration environment associated with the given client computing platform to which the values and/or other state information is transmitted.

Collaboration environment component 110 of machine-readable instructions 107 of client computing platform(s) 124 may be configured to effectuate presentation of one or more user interfaces of a collaboration environment. Presentation of the collaboration environment may be based on environment state information and/or other information.

Collaboration environment component 110 may be configured to effectuate presentation of a user interface through which the users initiate individual video dictation sessions. The user interface may include one or more user interface elements. An individual user interface element may be configured to be selected by the users to cause the user-initiation of the video dictation sessions. The user interface elements may be configured to facilitate user interaction with the user interface, user entry, and/or selection. By way of non-limiting illustration, the user interface elements may include one or more of text input fields, drop down menus, check boxes, display windows, virtual buttons, and/or other user interface elements. The user interface may be presented within and/or outside the collaboration environment. In some implementations, a user interface through which the users initiate individual video dictation sessions may be provided an external resource (e.g., an application outside of the system 100 and/or other resources).

The client computing platform(s) 124 may effectuate presentation of one or more user interfaces of the collaboration environment. The collaboration environment may include the environment in which users interact with and/or view the one or more units of work and/or projects managed via the collaboration work management platform. The collaboration environment may exist whether or not a given user is viewing and/or interacting with the collaboration environment. In some implementations, projects managed via the collaboration environment may include one or more units of work. By way of non-limiting example, the one or more units of work may include action items, to-do items, and/or objectives within a given project. The one or more units of work may be assigned to one or more users such that the one or more units of work assigned to a given user may appear on a given user's task list within the collaboration environment.

Dictation component 112 may be configured to obtain user input information and/or other information. The user input information may characterize user-initiation of the video dictation sessions by individual users of the collaboration environment. The user-initiation of the video dictation sessions by individual users may be a selection of one or more of the user interface elements, user entry by way of the one or more of the user interface elements, and/or user entry via one or more input devices (e.g., keyboard, mouse, etc.). The user interface elements may be presented to the individual users within a given project, within a given unit of work, and/or otherwise within and/or outside the collaboration environment. In some implementations, selection and/or interaction with the one or more user interface elements to initiate a video dictation session may automatically associate the video dictation session with a given project, a given unit, and/or provide other automatic association. As a result, generation of one or more values of one or more work unit parameters (e.g., assignees, due dates, start dates, etc.) of a given unit of work (e.g., task) may be generated and/or otherwise facilitate streamline generation of units of work based on the video dictation session because this information may already be known by virtue of the automatic association.

Responsive to the user-initiation of the video dictation sessions, dictation component 112 may be configured to obtain video information and/or other information. An image sensor of a client computing platform may be configured to generate output signals conveying the video information and/or other information. In some implementations, the video information may define one or more of an image, an image sequence, a video, and/or other representations of a real-world space. Individual images (e.g., video frames) may be defined by a set of pixels and/or other information. Individual pixels in the set of pixels may be defined by one or more of a pixel location, a pixel color, and/or other specifications. A pixel location may include a location on an image plane. Pixel color may be defined by chromaticity of colors specified within a color space, such as an RGB color space. An image sensor may include one or more of a charge-coupled device sensor, an active pixel sensor, a complementary metal-oxide semiconductor sensor, an N-type metal-oxide-semiconductor sensor, and/or other devices.

The video information may characterize content of the video dictation sessions. The content of the video dictation sessions may comprise one or more of visual content, audio content, and/or other content. The visual content may include visual representations of the individual users during the video dictation sessions, and/or other visual content. The audio content may include speech (e.g., words, phrases, noises, etc.) of the individual users during the video dictation sessions and/or other audio content. In some implementation, content of the video dictation sessions may be derived from the video information based on one or more video processing techniques through which individual ones of the visual content, audio content, and/or other content may be determined.

By way of non-limiting illustration, the video dictation sessions may include a first video dictation session. The first video dictation session may be responsive to a user-initiation by the first user. First video information characterizing content of the first video dictation session may be obtained. In some implementations, the video dictation sessions may be related to and/or specific to a given project and/or task within the collaboration environment. As such, a user participating in a given video dictation session may be working on and/or discussing a related and/or specific project and/or task. The first video dictation session may be a task-specific video dictation session. For example, the first video dictation session may relate to Task A. Dictation component 112 may be configured to transcribe one or more spoken communications. In some implementations, dictation component 112 may be configured to determine a source and/or intended recipient of individual items within the video dictation session.

In some implementations, dictation component 112 may be configured to implement an instance of a video dictation session through one or more user interfaces. Dictation component 112 may receive an/or transmit the communications (e.g., textual communications, voice communications, video communications, etc.) that make up the video dictation session to and/or from client computing platform(s) 124 and server(s) 102. The graphical video interface may be part of and/or external to the collaboration environment. The video dictation sessions may be hosted by the collaboration platform and/or one or more third party chat applications integrated with the collaboration platform via an application program interface (API). The video-sessions may be provided by one or more third-party video applications via one or more APIs. In some implementations the collaboration platform may host and/or provide one or more of the video dictation sessions. In some implementations, a video dictation session may correspond to a pre-recorded video dictation session, such as a recorded meeting between one or more users. By way of non-limiting illustration, a meeting between one or more users may be video recorded. The recording may comprise one or more of the visual content, audio content, and/or other content utilized to carry out one or more features and/or functionality described herein.

In some implementations, a video interface may include its own interface and/or a portion of one or more collaboration environment user interfaces for displaying one or more units of work and/or projects for a given user. Dictation component 112 may be configured to effectuate presentation of the video interfaces via the client computing platforms within and/or outside the collaboration environment. By way of non-limiting illustration, first video dictation session may be presented to the first user via a first video interface presented on a first client computing platform associated with the first user.

Work component 114 may be configured to generate one or more units of work for the users based on the content of the video dictation sessions by storing information defining the one or more units of work as part of the environment state information. Such generation may be responsive to detection of completion of the video dictation sessions. By way of non-limiting illustration, one or more work unit records of the one or more units of work may be generated. A first unit of work may be generated based on the content of the first video dictation session by storing information defining the first unit of work in a first work unit record.

In some implementations, generating the one or more units of work may be based on the content from the video dictation sessions may include automatically generating one or more values of one or more work unit parameters of the one or more units of work. Generating the units of work based on the content from the video dictation sessions may include automatically initiating the one or more units of work, and/or automatically generating one or more values of one or more work unit parameters describing the units of work. In some implementations, the one or more values of the one or more work unit parameters may include one or more of a title, a description, a due-date, an assignee, a start date, a project and/or unit of work associated with the generated unit of work, a dependency within a hierarchy, indication of complete and/or incomplete, custom fields, and/or other values. In some implementations, generating the one or more units of work may include automatically generating other metadata associated with the one or more units of work.

In some implementations, the units of work may be generated in real-time and/or near real-time during the video dictation session. By way of non-limiting example, as the user starts speaking within the video interface, work component 114 may identify one or more units of work that should be generated. The units of work, in some implementations, may be generated at or near the conclusion of the video dictation sessions. In some implementations, one or more units of work generated based on the content from the video dictation sessions may be presented to one or more of the users as one or more potential units of work. The potential units of work may be presented to the one or more users for confirmation and/or acceptance. One or more of the users may accept and/or confirm one or more of the potential units of work at the conclusion of the given video dictation session to generate the units of work. A video dictation session may conclude when: a threshold amount of time passes without any communication from one or more users, a user exits or closes the video interface, the user minimizes the video interface, the user responds to a request with acceptance language and/or the user otherwise concludes the video dictation session.

In some implementations, visual content from the video dictation sessions that may trigger generation of the one or more units of work for the users may include one or more trigger gestures and/or emotes. The trigger gestures and/or emotes may indicate a user's request, desire, inquiry, and/or need. By way of non-limiting illustration, a trigger gesture to generate a unit of work may include a thumbs-up gesture and/or other gestures conveying a desire to do something they are talking about. By way of non-limiting illustration, a trigger gesture and/or emote to generate a unit of work with low priority may include a shaking of the head and/or other gestures conveying a desire to do something but having little importance. The one or more units of work may be generated for the individual users based on identifying one or more of the trigger gestures and/or emotes from the visual content. Trigger gestures and/or emotes may be detected and/or identified from visual content based on one or more video processing techniques. By way of non-limiting illustration, the first unit of work may be generated based on identifying a first gesture and/or emote from the visual content in the content of the first video dictation session.

In some implementations, audio content from the video dictation sessions that may trigger generation of the units of work for the users may include one or more trigger phrases and/or words. In some implementations, dictation component 112 may be configured to detect and/or identify one or more trigger phrases and/or words based on natural language processing and/or other audio processing techniques. The trigger phrases and/or words may indicate a user's request, desire, inquiry, and/or need. By way of non-limiting illustration, the one or more units of work may be generated based on identifying one or more of the trigger phrases and/or words from the audio content. In some implementations, trigger phrases and/or words may include one or more of "to do", "need to", "should do", "check on", "I need", "UserA should", "Did I," and/or other words and/or phrases. In some implementations, trigger phrases and/or words may be direct recitations of values of one or more work unit parameters of a unit of work to be generated. By way of non-limiting illustration, a user may directly speak a desire to generate a unit of work, with a specific due date, and/or assigned to a specific assignee. By way of non-limiting illustration, a first unit of work may be generated based on identifying a first trigger phrase and/or word from the audio content in the content of the first video dictation session.

In some implementations, work component 114 may be configured to determine context of the video information. Work component 114 may be configured to generate one or more units of work for the users based on the context of the video information. Context may include user information for a user participating in the video dictation session, user information for one or more users identified in the video dictation session, and/or other context information. By way of non-limiting illustration, image-processing techniques, such as facial recognition, may be used to identify a user of a video dictation session. User information for the user may then be obtained. By way of non-limiting illustration, the first video information may include first context information. The first unit of work may be generated based on the first context information and/or other information.

In some implementations, work component 114 may be configured to identify individual users of the video dictation sessions based on the context of the video dictation sessions and/or other content. The individual users may be identified based on the audio content (e.g., a spoken name) and/or the visual content (e.g., appearing the video dictation session). In some implementations, individual users may be prompted (through a notification) to explicitly identify the user(s) of the video dictation sessions.

Work component 114 may be configured to obtain individual user records for the individual users. As previously described, individual user records may specify individual sets of preferences of the individual users. Work component 114 may be configured to generate the one or more units of work for the users further based on the individual sets of preferences of the individual users.

In some implementations, work component 114 may identify one or more recommended units of work that should and/or could be generated. The work unit component 114 may be configured to effectuate presentation of one or more recommendation including one or more prompts for generating the one or more recommended units of work. By way of non-limiting example, if a user starts speaking "I need to follow-up with X supplier . . . ", work component 114 may prompt the user with a recommendation for generating a corresponding unit of work. The prompt may be presented within the video interface in real time and/or near real time during the video dictation session. The user may be able to provide entry and/or selection to accept and/or deny recommendations. By way of non-limiting illustration, work component 114 may generate the unit of work for following-up with X supplier based on the responses to these prompts.

In some implementations, individual units of work may be automatically generated and/or accepted by the users. By way of non-limiting example, the work component 114 may be configured to identify acceptance language based on the video information for the video dictation sessions. Responsive to the work component 114 identifying acceptance language in response to communications triggering generation of a unit of work, work component 114 may automatically accept one or more generated units of work on behalf of the user. Acceptance may be provided through selection of a user interface element (e.g., a virtual button).

Work component 114 may be configured to store the video information as part of the environment state information. Such storage may be responsive to detection of completion of the video dictation sessions. As such, the video information may be included in the one or more work unit records generated for the one or more units of work. By way of non-limiting illustration, the first video information may be stored in the first work unit record. Work component 114 may be configured to communicate with collaboration environment component 110 and/or environment state component 108 to effectuate storage of the information defining the units of work generated as part of the environment state information.

In some implementations, work component 114 may be configured to modify one or more units of work based on the content from the video dictation sessions. Modifying one or more units of work may include modifying, changing, adjusting, adding, and/or removing one or more characteristics associated with individual ones of the units of work. By way of non-limiting example, the one or more characteristics of individual ones of the units of work may include one or more of a task description, a user assigned to a task, a due date, a start date, and/or other characteristics of the individual ones of the units of work. A second task may be modified based on the content of the first video information of the first video dictation session. Work component 114 may be configured to store information defining modifications of the units of work as part of the environment state information. As such, information defining a first modification for the second unit of work may be stored in a second work unit record of the second unit of work. In some implementations, modification of units of work may be determined based on one or more trigger phrases and/or words, and/or one or more trigger gestures and/or emotes.

The trigger component 116 may be configured to store trigger information. The trigger information may include trigger gestures and/or emotes, and/or trigger phrases and/or words, and the corresponding values of work unit parameter that may be generated (and/or modified) for one or more units of work. In some implementation, the trigger gestures and/or emotes, and/or trigger phrases and/or words, may be user-specific and/or system-wide. In some implementations, the trigger gestures and/or emotes, and/or trigger phrases and/or words, may be set by users and stored within the user records for the users. In some implementations, the trigger component 116 may be configured to determine trigger gestures and/or emotes, and/or trigger phrases and/or words, through one or more machine learning techniques. By way of non-limiting illustration, a user may go through a training process where a video dictation session and desired units of work are provided as input to train a machine learning model.

Figure 3A:
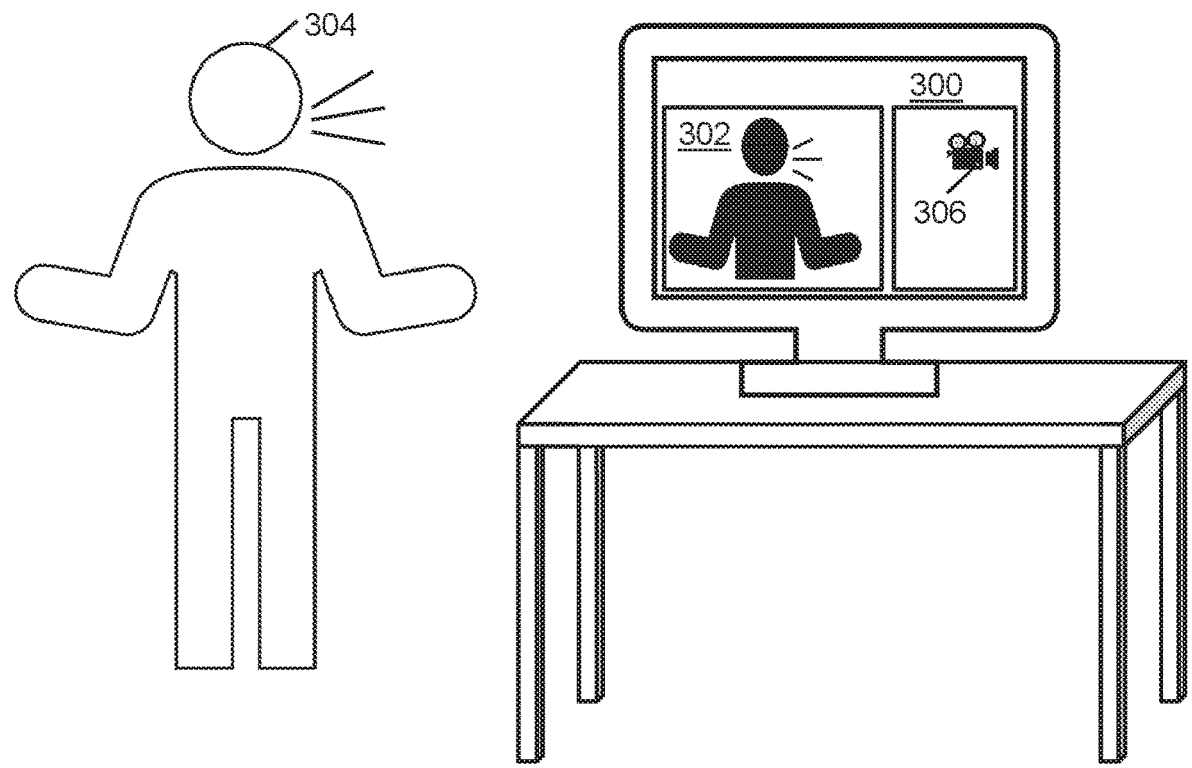
FIG. 3A illustrates an implementation of the system of FIG. 1.

FIG. 3A illustrates an exemplary video interface 302 from which video information is obtained and used as a basis for generating user units of work, in accordance with one or more implementations. In some implementations, video interface 302 may be presented within a view of collaboration environment 300. User 304 may initiate a video dictation session via video interface 302 by selecting user interface element 306. Video information characterizing the content of the video dictation session may be used to generate one or more units of work. User 304 may view themselves via video interface 302 during the video dictation session.

Figure 3B:
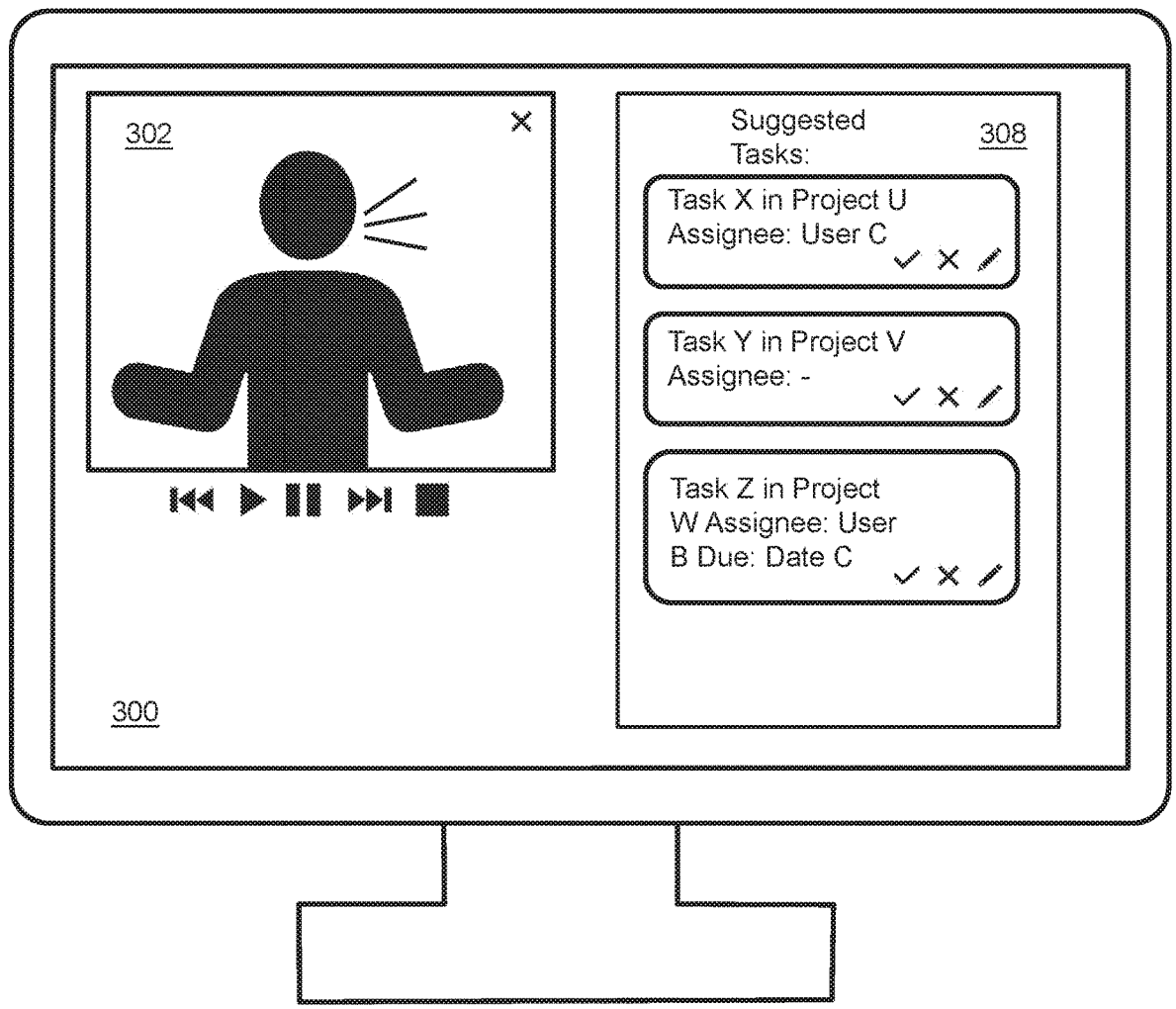
FIG. 3B illustrates a user interface, in accordance with one or more implementations.

FIG. 3B illustrates an exemplary video interface from which video information is obtained and used as a basis for generating user units of work, in accordance with one or more implementations. Collaboration environment 300 may include video interface 302 of which may be viewed/played back by one or more users and suggestion interface 308. The suggestion interface 308 may present one or more recommended units of work. One or more recommended units of work may be automatically generated based on the content information characterizing the content of the video dictation session and presented in the suggestion interface 308 during the video dictation session. The user may be able to accept and/or reject individual recommended units of work.

Figure 4:
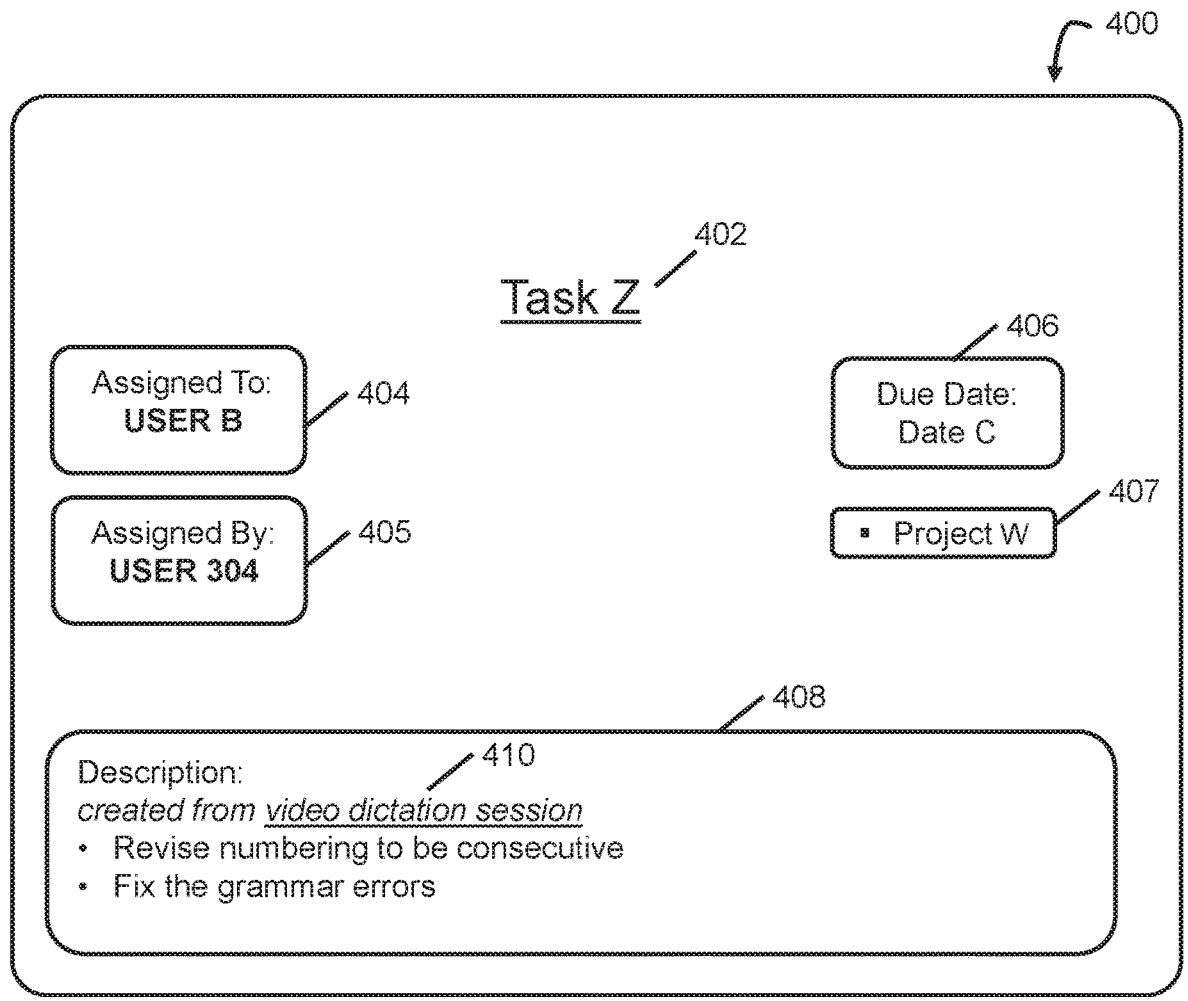
FIG. 4 illustrates a user interface, in accordance with one or more implementations.

FIG. 4 illustrates user interface 400, in accordance with one or more implementations. The user interface 400 may display a first unit of work. The user interface 400 may display different values of one or more work unit parameters of the first unit of work, and/or other information. Individual values of the one or more work unit parameters may be determined based on content of a video dictation session. By way of non-limiting illustration, user interface 400 may display one or more user interface elements related to the first unit of work. The one or more user interface elements may include a user interface element 402 that may display a title of the second unit of work (e.g., Task Z). A user interface element 404 may display an assignee of the first unit of work. A user interface element 406 may display a due date of the first unit of work. A user interface element 405 may display an assignor of the first unit of work (e.g., user 304 from video dictation session of FIG. 3A-B). A user interface element 407 may display a project the first unit of work is a part of. A user interface element 408 may display a description for the first unit of work. Some or all of the content of the video dictation session may be displayed in user interface element 408 and/or made accessible via a link 410.

Returning to FIG. 1, in some implementations, server(s) 102, client computing platform(s) 124, and/or external resources 122 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 124, and/or external resources 122 may be operatively linked via some other communication media.

A given client computing platform may include one or more processors configured to execute computer program components. The computer program components may be configured to enable an expert or user associated with the given client computing platform to interface with system 100 and/or external resources 122, and/or provide other functionality attributed herein to client computing platform(s) 124. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 122 may include sources of information outside of system 100, external entities participating with system 100, hosts of video recording functionality, and/or other resources. In some implementations, some or all of the functionality attributed herein to external resources 124 may be provided by resources included in system 100.

Server(s) 102 may include electronic storage 126, one or more processors 104, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Processor(s) 104 may be configured to provide information processing capabilities in server(s) 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include a plurality of processing units. These processing units may be physically located within the same device, or processor(s) 104 may represent processing functionality of a plurality of devices operating in coordination. Processor(s) 104 may be configured to execute component 180, and/or other components such as components 110, 112, 114, and/or 116. Processor(s) 104 may be configured to execute components 108, 110, 112, 114, 116, and/or other components by software; hardware; firmware; some combination of software, hardware, and/or firmware; and/or other mechanisms for configuring processing capabilities on processor(s) 104. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although component 108 is illustrated in FIG. 1 as being implemented within a single processing unit, in implementations in which processor(s) 104 includes multiple processing units, component 108 may be implemented remotely from the other components.

Processor(s) 105 may be configured to provide information processing capabilities in client computing platform(s) 124. As such, processor(s) 105 may include one or more of a digital processor, an analog processor, a digital circuit designed to process information, an analog circuit designed to process information, a state machine, and/or other mechanisms for electronically processing information. Although processor(s) 105 is shown in FIG. 1 as a single entity, this is for illustrative purposes only. In some implementations, processor(s) 105 may include a plurality of processing units. These processing units may be physically located within the same device, or processor(s) 105 may represent processing functionality of a plurality of devices operating in coordination. Although components 110, 112, 114, and/or 116 are illustrated in FIG. 1 as being implemented within a single processing unit, in implementations in which processor(s) 105 includes multiple processing units, one or more of components 110, 112, 114, and/or 116 may be implemented remotely from the other components. The description of the functionality provided by the different components 110, 112, 114, and/or 116 described below is for illustrative purposes, and is not intended to be limiting, as any of components 110, 112, 114, and/or 116 may provide more or less functionality than is described. For example, one or more of components 110, 112, 114, and/or 116 may be eliminated, and some or all of its functionality may be provided by other ones of components 110, 112, 114, and/or 116. As another example, processor(s) 104 may be configured to execute one or more additional components that may perform some or all of the functionality attributed below to one of components 110, 112, 114, and/or 116, and/or processor(s) 105 may be configured to execute one or more additional components that may perform some or all of the functionality attributed below to one of components 110, 112, 114, and/or 116.

The electronic storage 126 may include electronic storage media that electronically stores information. The electronic storage media of electronic storage 126 may include one or both of system storage that is provided integrally (i.e., substantially non-removable) with one or more servers 102 and/or removable storage that is removably connected to one or more servers 102. The connection may be facilitated by, for example, a port (e.g., a USB port, a firewire port, etc.) or a drive (e.g., a disk drive, etc.).

The electronic storage 126 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 126 may include one or more virtual storage resources (e.g., cloud storage, a virtual private network, and/or other virtual storage resources). The electronic storage 126 may store software algorithms, information determined by processor(s) 104, information received by one or more servers 102, information received by client computing platforms 124, and/or other information that enables one or more servers 102 to function as described herein.

The electronic storage 126 may be configured to store one or more records and/or information. The one or more records may include one or more of user records 128, project records 130, work unit records 132, and/or other records. The one or more records (e.g., user records 128, project records 130, work unit records 132, and/or other records) may specify and or define values for one or more user parameters, project parameters, work unit parameters, and/or other parameters for the collaboration environment. The one or more records may specify correspondences between one or more of the user records 128, project records 130, work unit records 132, and/or other records. The correspondences may be used to determine which user parameters and/or values, project parameters and/or values, and/or work unit parameters and/or values are associated with a given user, project, and/or unit of work within the collaboration environment.

The electronic storage 120 may include electronic storage media that electronically stores information. The electronic storage media of electronic storage 120 may include one or both of system storage that is provided integrally (i.e., substantially non-removable) with one or more client computing platforms 124 and/or removable storage that is removably connected to one or more client computing platforms 124. The connection may be facilitated by, for example, a port (e.g., a USB port, a firewire port, etc.) or a drive (e.g., a disk drive, etc.).

The electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 120 may include one or more virtual storage resources (e.g., cloud storage, a virtual private network, and/or other virtual storage resources). The electronic storage 120 may store software algorithms, information determined by processor(s) 105, information received from one or more servers 102, information received by client computing platforms 124, and/or other information that enables one or more client computing platforms 124 to function as described herein.

Figure 2:
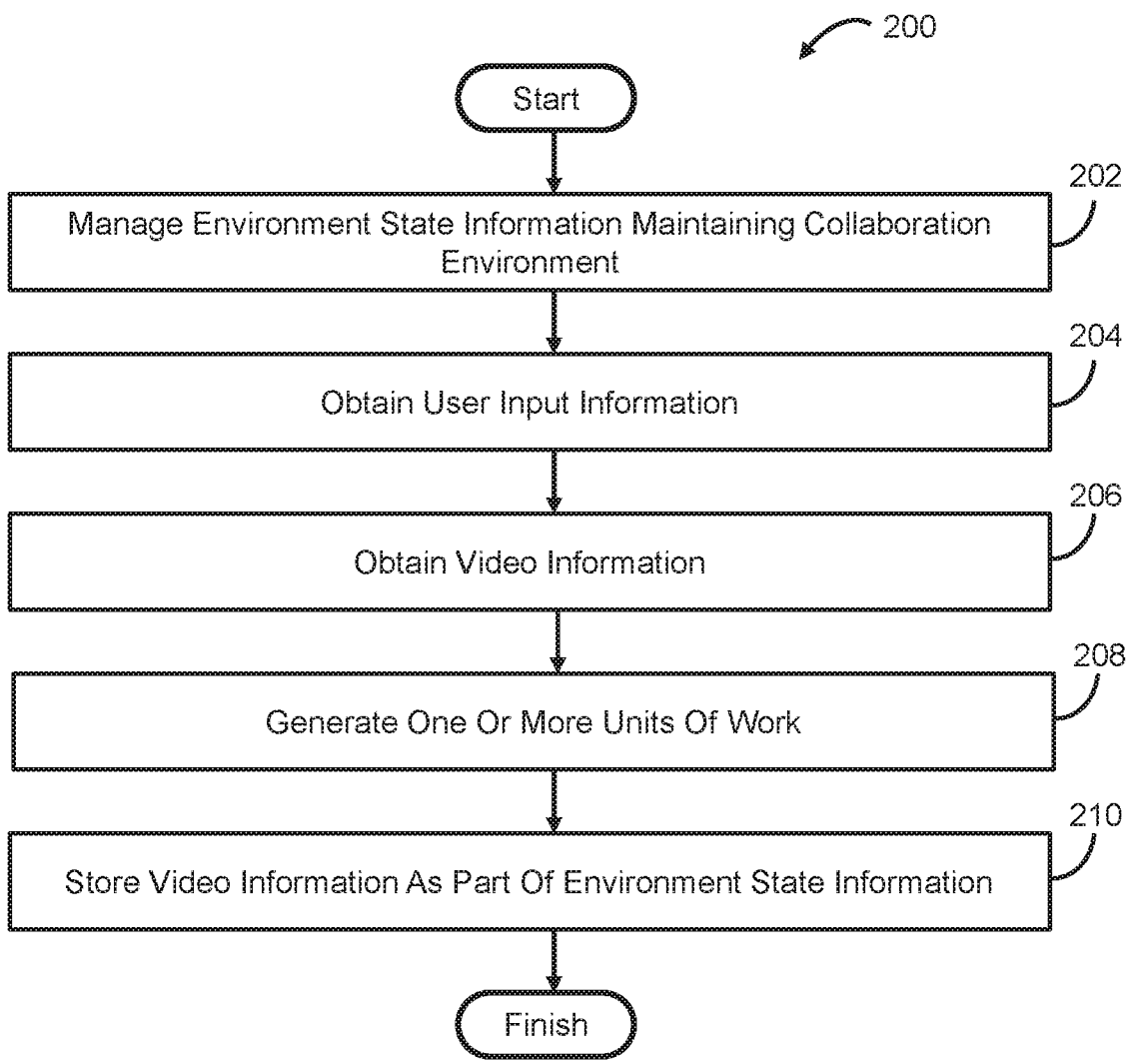
FIG. 2 illustrates a method to generate units of work within a collaboration environment based on video dictation, in accordance with one or more implementations.

FIG. 2 illustrates a method 200 to generate units of work within a collaboration environment based on video dictation, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include managing environment state information maintaining a collaboration environment. Operation 202 may be performed by one or more hardware processors configured by machine-readable instructions including a component that is the same as or similar to environment state component 108, in accordance with one or more implementations.

An operation 204 may include obtaining user input information characterizing user-initiation of video dictation sessions by individual users of the collaboration environment. Operation 204 may be performed by one or more hardware processors configured by machine-readable instructions including a component that is the same as or similar to dictation component 112, in accordance with one or more implementations.

An operation 206 may include obtaining video information characterizing content of the video dictation sessions. Such obtaining may be responsive to the user-initiation of the video dictation sessions. Operation 206 may be performed by one or more hardware processors configured by machine-readable instructions including a component that is the same as or similar to dictation component 112, in accordance with one or more implementations.

An operation 208 may include generating one or more units of work for the users based on the content of the video dictation sessions. Generating the one or more units of work may be by storing information defining the one or more units of work as part of the environment state information. Such generating may be responsive to detection of completion of the video dictation sessions. Operation 208 may be performed by one or more hardware processors configured by machine-readable instructions including a component that is the same as or similar to work component 114, in accordance with one or more implementations.

An operation 210 may include storing the video information as part of the environment state information. Such storing may be responsive to detection of completion of the video dictation sessions. Operation 210 may be performed by one or more hardware processors configured by machine-readable instructions including a component that is the same as or similar to work component 114, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to generate work unit records for units of work managed within a collaboration environment based on video dictation, the system comprising:
one or more physical processors configured by machine-readable instructions to:
manage environment state information maintaining a collaboration environment, the collaboration environment being configured to facilitate interaction by users with the collaboration environment, the environment state information including user records and work unit records, the user records describing preferences of the users, the work unit records describing units of work assigned, created, and/or managed within the collaboration environment, the user records including a first user record associated with a first user accessing the collaboration environment;
effectuate presentation of instances of a user interface through which the users initiate video dictation sessions, the user interface including one or more user interface elements, wherein an individual user interface element is configured to be selected by the users to cause the video dictation sessions to be initiated, such that a first instance of the user interface is presented on a computing platform associated with the first user;
obtain user input information characterizing user input into the instances of the user interface, wherein the user input includes selection of the individual user interface element causing user-initiation of the video dictation sessions by individual users of the collaboration environment;
identify the individual users who selected the individual user interface element to initiate individual video dictation sessions, including identify the first user has selected the individual user interface element to initiate a first video dictation session;
obtain individual user records associated with the individual users who selected the individual user interface element to initiate the individual video dictation sessions, such that responsive to identifying the first user, obtain the first user record associated with the first user;
responsive to the user-initiation of the video dictation sessions through the selection of the individual user interface element, obtain video information characterizing content of the video dictation sessions, wherein the content of the video dictation sessions comprises visual content and audio content, the visual content including visual representations of the individual users during the individual video dictation sessions, and the audio content including speech of the individual users during the individual video dictation sessions, such that responsive to the selection of the individual user interface element by the first user causing the user-initiation of the first video dictation session, obtain first video information characterizing content of the first video dictation session;

identify, based on the video information, one or more recommended units of work that should be generated, and present the one or more recommended units of work within one or more prompts displayed during the video dictation sessions, such that a first recommended unit of work is identified based on the first video information and presented in a first prompt displayed during the first video dictation session;

train one or more machine learning models to generate one or more trained machine learning models, wherein the one or more trained machine learning models are configured to output the preferences of the users, wherein the one or more machine learning models are trained based on training inputs that are specific to the individual users so that the one or more trained machine learning models reflect individualized training for the individual users;

store the output of the one or more trained machine learning models in the individual user records of the individual users, such that the first user record for the first user includes a first set of preferences of the first user derived from the individualized training of the one or more machine learning models based on a first set of training inputs specific to the first user, the first set of preferences including an automated action to carry out in response to occurrence of a trigger event during the first video dictation session, wherein the automated action includes one or more of generation of a project record for a project, generation of a task record for a task, assignment of an individual work unit record to a particular user, or attachment of one or more particular documents to the individual work unit record; and responsive to detection of completion of the video dictation sessions:

generate one or more work unit records for one or more units of work based on i) the individual user records of the individual users who initiated the individual video dictation sessions, ii) the content of the individual video dictation sessions, and iii) whether individual recommended units of work have been accepted or denied, the one or more work unit records being generated by storing information defining the one or more units of work as part of the environment state information, wherein a first work unit record for a first unit of work is generated based on the first set of preferences of the first user included in the first user record, the content of the first video dictation session, and whether the first user accepted or denied the first recommended unit of work; and store the video information as part of the environment state information such that the video information is included in the one or more work unit records generated for the one or more units of work, such that the first video information is stored in the first work unit record.

2. The system of claim 1, wherein the instances of the user interface are presented within the collaboration environment.

3. The system of claim 1, wherein the one or more physical processors are further configured by the machine-readable instructions to:

modify one or more of the work unit records based on the content of the video dictation sessions, wherein a second unit of work is modified based on the content of the first video information of the first video dictation session; and store information defining modifications of the one or more of the work unit records as part of the environment state information such that information defining a first modification for the second unit of work is stored in a second work unit record of the second unit of work.

4. The system of claim 1, wherein the audio content from the video dictation sessions that triggers generation of the one or more work unit records for the users includes one or more trigger phrases and/or words, such that the one or more work unit records are generated based on identifying one or more of the trigger phrases and/or words from the audio content, such that the first unit of work is generated based on identifying a first trigger phrase and/or word from the audio content in the content of the first video dictation session.

5. The system of claim 1, wherein the visual content from the video dictation sessions that triggers generation of the one or more work unit records for the users includes one or more trigger gestures and/or emotes, such that the one or more work unit records are generated for the individual users based on identifying one or more of the trigger gestures and/or emotes from the visual content, such that the first unit of work is generated based on identifying a first gesture and/or emote from the visual content in the content of the first video dictation session.

6. The system of claim 1, wherein the one or more work unit records are further generated based on context of the video dictation sessions, wherein the first video information includes first context information and wherein the first unit of work is generated based on the first context information for the first video dictation session.

7. The system of claim 1, wherein generating the one or more work unit records based on the individual user records and the content from the video dictation sessions includes automatically generating one or more values of one or more work unit parameters of the one or more work unit records, wherein the one or more work unit parameters characterize one or more of task name, project name, task description, project description, user assignment, or completion status.

8. The system of claim 7, wherein automatically generating the one or more values of the one or more work unit parameters of the one or more work unit records is based on trigger information, the trigger information including trigger gestures and/or emotes, and/or trigger phrases and/or words, and corresponding ones of the one or more values of the one or more work unit parameters.

9. A method to generate work unit records for units of work managed within a collaboration environment based on video dictation, the method comprising:

managing environment state information maintaining a collaboration environment, the collaboration environment being configured to facilitate interaction by users with the collaboration environment, the environment state information including user records and work unit records, the user records describing preferences of the users, the work unit records describing units of work assigned, created, and/or managed within the collaboration environment, the user records including a first user record associated with a first user accessing the collaboration environment;

effectuating presentation of instances of a user interface through which the users initiate video dictation sessions, the user interface including one or more user interface elements, wherein an individual user interface element is configured to be selected by the users to cause the video dictation sessions to be initiated, including effectuating presentation of a first instance of the user interface on a computing platform associated with the first user;

obtaining user input information characterizing user input into the instances of the user interface, wherein the user input includes selection of the individual user interface element causing user-initiation of the video dictation sessions by individual users of the collaboration environment;

identifying the individual users who selected the individual user interface element to initiate individual video dictation sessions, including identifying the first user has selected the individual user interface element to initiate a first video dictation session;

obtaining individual user records associated with the individual users who selected the individual user interface element to initiate the individual video dictation sessions, including responsive to identifying the first user, obtaining the first user record associated with the first user;

responsive to the user-initiation of the video dictation sessions through the selection of the individual user interface element, obtaining video information characterizing content of the video dictation sessions, wherein the content of the video dictation sessions comprises visual content and audio content, the visual content including visual representations of the individual users during the individual video dictation sessions, and the audio content including speech of the individual users during the individual video dictation sessions, including responsive to the selection of the individual user interface element by the first user causing the user-initiation of the first video dictation session, obtaining first video information characterizing content of the first video dictation session;

identifying, based on the video information, one or more recommended units of work that should be generated, and presenting the one or more recommended units of work within one or more prompts displayed during the video dictation sessions, including identifying a first recommended unit of work based on the first video information and presenting the first recommended unit of work in a first prompt displayed during the first video dictation session;

training one or more machine learning models to generate one or more trained machine learning models, wherein the one or more trained machine learning models are configured to output the preferences of the users, wherein the one or more machine learning models are trained based on training inputs that are specific to the individual users so that the one or more trained machine learning models reflect individualized training for the individual users;

storing the output of the one or more trained machine learning models in the individual user records of the individual users, including storing the output in the first user record for the first user, the output stored in the first user record including a first set of preferences of the first user derived from the individualized training of the one or more machine learning models based on a first set of training inputs specific to the first user, the first set of preferences including an automated action to carry out in response to occurrence of a trigger event during the first video dictation session, wherein the automated action includes one or more of generation of a project record for a project, generation of a task record for a task, assignment of an individual work unit record to a particular user, or attachment of one or more particular documents to the individual work unit record; and responsive to detection of completion of the video dictation sessions:
  generating work unit records for one or more one or more units of work based on i) the individual user records of the individual users who initiated the individual video dictation sessions, ii) the content of the individual video dictation sessions, and iii) whether individual recommended units of work have been accepted or denied, the one or more work unit records being generated by storing information defining the one or more units of work as part of the environment state information, including generating a first work unit record for a first unit of work based on the first set of preferences of the first user included in the first user record, the content of the first video dictation session, and whether the first user accepted or denied the first recommended unit of work; and
  storing the video information as part of the environment state information such that the video information is included in the one or more work unit records generated for the one or more units of work, including storing the first video information in the first work unit record.

10. The method of claim 9, wherein the instances of the user interface are presented within the collaboration environment.

11. The method of claim 9, further comprising:
  modifying one or more of the work unit records based on the content of the video dictation sessions, including modifying a second unit of work based on the content of the first video information of the first video dictation session; and
  storing information defining modifications of the one or more of the work unit records as part of the environment state information including storing information defining a first modification for the second unit of work a second work unit record of the second unit of work.

12. The method of claim 9, wherein the audio content from the video dictation sessions that triggers generation of the one or more work unit records for the users includes one or more trigger phrases and/or words, such that the one or more work unit records are generated based on identifying one or more of the trigger phrases and/or words from the audio content, such that the first unit of work is generated based on identifying a first trigger phrase and/or word from the audio content in the content of the first video dictation session.

13. The method of claim 9, wherein the visual content from the video dictation sessions that triggers generation of the one or more work unit records for the users includes one or more trigger gestures and/or emotes, such that the one or more work unit records are generated for the individual users based on identifying one or more of the trigger gestures and/or emotes from the visual content, such that the first unit of work is generated based on identifying a first gesture and/or emote from the visual content in the content of the first video dictation session.

14. The method of claim 9, wherein the one or more work unit records are further generated based on context of the video dictation sessions, wherein the first video information includes first context information and wherein the first unit of work is generated based on the first context information for the first video dictation session.

15. The method of claim 9, wherein the generating the one or more work unit records based on the individual user records and the content from the video dictation sessions includes automatically generating one or more values of one or more work unit parameters of the one or more work unit records, wherein the one or more work unit parameters characterize one or more of task name, project name, task description, project description, user assignment, or completion status.

16. The method of claim 15, wherein the automatically generating the one or more values of the one or more work unit parameters of the one or more work unit records is based on trigger information, the trigger information including trigger gestures and/or emotes, and/or trigger phrases and/or words, and corresponding ones of the one or more values of the one or more work unit parameter.

17. The system of claim 1, wherein the collaboration environment is accessed via instances of an environment user interface through which the users interact with each other, and interact with and/or view the work unit records.

18. The method of claim 9, wherein the collaboration environment is accessed via instances of an environment user interface through which the users interact with each other, and interact with and/or view the work unit records.

* * * * *